US012621918B2

(12) United States Patent
Steffens

(10) Patent No.: US 12,621,918 B2
(45) Date of Patent: May 5, 2026

(54) MODULES FOR A LUMINAIRE, LUMINAIRE AND SYSTEM

(71) Applicant: ZUMTOBEL LIGHTING GMBH, Dornbirn (AT)

(72) Inventor: Thomas Steffens, Lindenberg im Allgäu (DE)

(73) Assignee: Zumtobel Lighting GmbH, Dornbirn (AT)

( * ) Notice: Subject to any disclaimer, the term of this patent is extended or adjusted under 35 U.S.C. 154(b) by 133 days.

(21) Appl. No.: 18/684,900

(22) PCT Filed: Sep. 20, 2022

(86) PCT No.: PCT/EP2022/076068
§ 371 (c)(1),
(2) Date: Feb. 20, 2024

(87) PCT Pub. No.: WO2023/046668
PCT Pub. Date: Mar. 30, 2023

(65) Prior Publication Data
US 2024/0357725 A1 Oct. 24, 2024

(30) Foreign Application Priority Data
Sep. 22, 2021 (EP) .................................... 21198249

(51) Int. Cl.
*H05B 47/19* (2020.01)
*H05B 47/18* (2020.01)
*H05B 47/195* (2020.01)

(52) U.S. Cl.
CPC ......... *H05B 47/195* (2020.01); *H05B 47/183* (2024.01); *H05B 47/19* (2020.01)

(58) Field of Classification Search
CPC ..... H05B 47/19; H05B 47/195; H05B 47/183
See application file for complete search history.

(56) References Cited

U.S. PATENT DOCUMENTS

2014/0139140 A1* 5/2014 Yeh ...................... H05B 47/183 315/297

FOREIGN PATENT DOCUMENTS

JP 2004063228 A * 2/2004
WO 2010097737 A1 9/2010
(Continued)

OTHER PUBLICATIONS

PCT/EP2022/076068, International Search Report and Written Opinion, Nov. 14, 2022, 7 pages.
(Continued)

*Primary Examiner* — Henry Luong
(74) *Attorney, Agent, or Firm* — Andrus Intellectual Property Law, LLP

(57) ABSTRACT

The invention relates to a module (1*a*) for a luminaire. The module (1*a*) comprises a processing unit (2*a*) and a transmitter (3*a*) for wireless communication. The module (1*a*) may be electrically connected with a bus of the luminaire. In response to an event and/or a command of the luminaire, the processing unit (2*a*) is configured to control the transmitter (3*a*) to transmit a data packet (6), when the module (1*a*) is electrically connected with the bus of the luminaire. The data packet (6) comprises information on the event and/or the command of the luminaire in association with an address of the luminaire and a packet number; wherein the packet number is incremented by a number, optionally by one, each time the processing unit (2*a*) controls the transmitter (3*a*) to transmit the data packet (6). The invention relates to a further module, a luminaire and a system comprising the module and the further module.

11 Claims, 4 Drawing Sheets

(56) References Cited

FOREIGN PATENT DOCUMENTS

| | | | |
|---|---|---|---|
| WO | 2013016534 | A1 | 1/2013 |
| WO | 2021130011 | A1 | 7/2021 |

OTHER PUBLICATIONS

International Standard, Digital addressable lighting interface—Part 104: General requirements—Wireless and alternative wired system components, IEC 62386-104, May 2019, 19 pages.

* cited by examiner

MODULES FOR A LUMINAIRE, LUMINAIRE AND SYSTEM

CROSS-REFERENCE TO RELATED APPLICATION

The present application is the U.S. national stage application of international application PCT/EP2022/076068 filed Sep. 20, 2022, which international application was published on Mar. 30, 2023 as International Publication WO 2023/046668 A1. The international application claims priority to European Patent Application 21198249.1, filed Sep. 22, 2021.

TECHNICAL FIELD OF THE INVENTION

The invention relates to modules for a luminaire, a luminaire comprising one of such modules and a system comprising such modules.

BACKGROUND OF THE INVENTION

For providing lighting to an area, such as an indoor area (e.g. an office, a private home etc.) or outdoor area (e.g. street lighting), it is known to arrange a plurality of luminaires in the area, wherein each luminaire may contribute to the lighting of the area by emitting light. A luminaire of the luminaires may be configured to emit light dependent on the environment of the luminaire. For example, the luminaire may comprise a sensor for detecting presence of a person in a vicinity of the luminaire, wherein as soon as presence of a person is detected the luminaire may start emitting light. In addition or alternatively, the luminaire may be configured to start light emission in response to a person turning the luminaire on via a light switch.

Optionally, the light emission of the other luminaires in the area may also be controlled dependent on the light emission of the aforementioned luminaire. That is, in case the luminaire starts light emission in response to detecting a person in its vicinity, neighboring luminaires may be controlled to also start light emission. This provides an improved lighting of the area for the person, because the area is not only lighted in the vicinity of the luminaire detecting the person, but may also be lighted by the neighboring luminaires. This increases the part of the area that is lighted. For this, wireless signals may be communicated among the luminaires allowing the luminaires to emit light dependent on the state and/or commands of other luminaires.

Thus, in case a luminaire detects presence of a person in its vicinity, the luminaire may start emitting light. In addition, the luminaire may wirelessly transmit a wireless signal or data packet indicating this event (detection of the presence of a person), in order to inform neighboring luminaires about this event allowing the neighboring luminaires to also react to this event e.g. by emitting light. Optionally, when a neighboring luminaire receives the wireless signal or data packet indicating that the luminaire detected a presence of a person in its vicinity, the neighboring luminaire also starts emitting light. However, due to environmental issues the wireless signals or data packets wirelessly communicated among the luminaires may not always be received at a respective luminaire with the same quality. In particular, in case a neighboring luminaire is arranged at the border of the transmission range of a luminaire wirelessly transmitting a data packet or wireless signal, it may happen that the neighboring luminaire merely receives a part of the data packet or wireless signal or does not receive the data packet or wireless signal at all. This may lead to a case, in which the neighboring luminaire arranged at the border of the transmission range sometimes reacts to a wireless communication from the luminaire and sometimes not.

As a result, in case the reaction is light emission, the light emission of the neighboring luminaire arranged on the border of the transmission range may be sporadically switched on and off. That is, the neighboring luminaire does not behave as it is intended by the wireless communication. In contrast, this may lead to an unwanted switching on and off of light emission of the neighboring luminaire, which may be disturbing for a person in the area. In particular, the switching on of the light emission of the neighboring luminaire triggered by the wireless communication may be sporadic dependent on whether the wireless communication is received or not by the neighboring luminaire.

SUMMARY OF THE INVENTION

In the light of the above, it is an object of the invention to provide means allowing to overcome the aforementioned drawback.

These and other objects, which become apparent upon reading the following description, are solved by the subject-matter of the independent claims. The dependent claims refer to preferred embodiments of the invention.

According to a first aspect of the present disclosure, a module for a luminaire is provided. The module comprises a processing unit and a transmitter for wireless communication. The module is configured to be electrically connected with a bus of the luminaire. In response to an event and/or a command of the luminaire, the processing unit is configured to control the transmitter to transmit a data packet when the module is electrically connected with the bus of the luminaire. The data packet comprises information on the event and/or the command of the luminaire in association with an address of the luminaire and a packet number. The packet number is incremented by a number (e.g. by one) each time the processing unit controls the transmitter to transmit the data packet.

Transmitting the information on the event and/or the command as part of a data packet that additionally comprises the address of the luminaire (to which the module is electrically connectable) and the packet number allows another module or another luminaire, receiving the data packet, to compute an error rate with regard to wirelessly communicating or transmitting the data packet to the module respectively luminaire. Based on the error rate, the other module or other luminaire may determine whether the transmission quality is good enough so that receiving of every data packet from the module is possible. As a result, the module of the first aspect contributes to overcoming the above described drawback. In particular, the module of the first aspect allows control of light emission of another luminaire based on a wireless communication only in case the other luminaire is within a transmission range of the wireless communication sufficient to receive wirelessly communicated data from the module.

In other words, the packet number associated with the address of the luminaire is incremented each time the processing unit controls the transmitter to transmit the data packet. For example, the packet number of a second data packet being transmitted by the module after a first data packet equals to the packet number of the first data packet incremented by one, wherein the first and second data packet each comprise the address of the luminaire. Accordingly, the packet number of a third data packet being transmitted by the module after the second data packet equals to the packet number of the second data packet incremented by one and to the packet number of the first data packet incremented by two. The first, second and third data packet each comprise the address of the luminaire. This continues accordingly. In the aforementioned example, the packet number is incremented by one. Optionally, the packet number may be incremented by number greater than one.

The maximum value of the packet number may be limited, e.g. by the number of bits used in the data packet for representing the packet number. In this case, after the maximum value of the packet number is reached for a data packet, the packet number of a following data packet, directly transmitted by the module after the data packet, is set to the smallest value of the packet number. Each time a data packet is transmitted by the module the packet number is incremented (e.g. by one) until reaching the maximum value again. The smallest value of the packet number may be zero or one. The packet number may be a positive integer starting with zero or one.

The luminaire may be a free-standing luminaire or any other type of luminaire, such as a ceiling lamp, desk-lamp, wall lamp etc. That is, the luminaire may be an indoor luminaire. Alternatively, the luminaire may be an outdoor luminaire (e.g. street luminaire).

The event of the luminaire may be a detection of presence and/or movement of a person in a vicinity of the luminaire or no detection of presence and/or movement of a person in the vicinity of the luminaire. The event of the luminaire may be the luminaire receiving information that a neighboring luminaire detects presence and/or movement of a person in a vicinity of the neighboring luminaire or receiving information that a neighboring luminaire does not detect presence and/or movement of a person in the vicinity of the neighboring luminaire. However, the invention is not limited to the example of presence or movement detection. It would also be possible to define a button pressing operation at one luminaire that causes changing of the light level of the luminaire itself and the surrounding luminaires. The terms "environment of a luminaire" and "surroundings of a luminaire" may be used as synonyms for the term "vicinity of a luminaire".

The command may instruct starting light emission or stopping light emission. In addition or alternatively, the command may instruct emitting light at a dimming level (i.e. setting a dimming level); increasing light emission by a first degree or extent; or decreasing light emission by a second degree or extent.

The information on the event indicates the event. For example, in case the event is detection of presence and/or movement of a person in a vicinity of the luminaire, then the information on the event indicates that in the vicinity of the luminaire presence and/or movement of a person is detected. Information on the command indicates the command. For example, in case the command instructs starting light emission, then the information on the command indicates that light emission is to be started.

The address of the luminaire may be or may comprise information that allows differentiating, based on the address, the luminaire from other luminaires. Any known address type or address format may be used.

Optionally, the module according to the first aspect comprises a receiver for wireless communication and a data storage. The receiver may be configured to receive data packets, each comprising information on an event and/or a command in association with the address of a further luminaire, which transmitted the received data packets, and a packet number. The later a respective received data packet of the received data packets has been transmitted by the further luminaire the greater the packet number of the respective received data packet. The processing unit may be configured to chronologically store, in the data storage, the different packet numbers of the received data packets in association with the address of the further luminaire. Further, the processing unit may be configured to compute for the address of the further luminaire, based on the different packet numbers of the received data packets, an error rate with regard to receiving the data packets from the further luminaire. Furthermore, the processing unit may be configured to perform an action dependent on the information on the event and/or the command of the received data packets, in case the computed error rate is less than or equal to a threshold for the error rate.

In other words, the processing unit may be configured to compute or determine for the address of the further luminaire, based on the different packet numbers of the received data packets, the quality of wireless communication or the transmission quality with regard to the further luminaire. In case the quality is greater than or equal to a threshold for the quality (the computed error rate being less than or equal to the threshold for the error rate), the processing unit may be configured to perform or start performing the action. In case the quality is less than the threshold for the quality (the error rate being greater than the threshold for the error rate), the processing unit may be configured to not perform or to stop performing the action.

Computing the error rate and comparing the computed error rate with the threshold for the error rate allows the module to determine whether the transmission quality is good enough so that receiving of every data packet from the further luminaire is possible. As a result, the module of the first aspect contributes to overcoming the above described drawback. In particular, the module of the first aspect, when electrically connected to the luminaire, allows control of light emission of the luminaire based on a wireless communication only in case the luminaire is within a transmission range of the wireless communication of the further luminaire that is sufficient to receive wireless communicated data from the further luminaire.

Based on the packet number, the processing unit may be configured to determine which of data packets previously transmitted from the further luminaire have been received by the receiver. Based on this determination, the processing unit may be configured to determine a transmission quality or error rate of the wireless transmission of data packets from the further luminaire to the module.

The above description on the data packet that may be transmitted by the module is correspondingly valid for the received data packets. The further luminaire may be a luminaire according to the third aspect of the present disclosure, as described below. The further luminaire may comprise a module according to the first aspect for transmitting the data packets that may be received by the optional receiver of the module according to the first aspect.

The information on the event and/or the command of the received data packets may be differently. Optionally two or more directly subsequent received data packets may comprise the same information on the event and/or the command. This may be the case, when in response to an event and/or command the further luminaire repeatedly transmits a data packet comprising information on the event and/or command.

For example, a received data packet of the received data packets may comprise information on an event indicating that presence and/or movement of a person has been detected by the further luminaire. Alternatively or additionally, a received data packet of the received data packets may comprise information on a command instructing to start light emission.

The data storage may be volatile, non-volatile or comprise a volatile part and a non-volatile part. The term "memory" may be used as a synonym for the term "data storage". The data storage may be or may comprise any type of data storage known in the art.

For example, the processing unit may be configured to chronologically store the different packet numbers of the received data packets in association with the address of the further luminaire in a table (e.g. a look-up table).

The greater the computed error rate the greater the number of data packets transmitted by the further luminaire that have not been received by the receiver of the module and vice versa. Thus, the greater the computed error rate the greater the probability that data packets transmitted by the further luminaire are not received by the receiver of the module because the wireless communication from the further luminaire to the module is disturbed (e.g. the module being outside the transmission range of the further luminaire) and vice versa. Therefore, the greater the computed error rate, the lower the transmission quality of wireless communication from the further luminaire and, thus, the lower the probability that every data packet transmitted from the further luminaire is received by the receiver of the module and vice versa.

When the computed error rate is less than or equal to the threshold for the error rate, then the module is within a transmission range of the wireless communication from the further luminaire that is sufficient to receive wirelessly communicated data from the further luminaire. When the computed error rate is greater than the threshold for the error rate, then the module is within a transmission range of the wireless communication from the further luminaire that is not sufficient to receive wirelessly communicated data from the further luminaire.

Therefore, when the computed error rate is less than or equal to the threshold for the error rate, then the transmission quality of wireless communication from the further luminaire to the module may be sufficient to ensure that every data packet transmitted from the further luminaire is receivable by the receiver of the module. When the computed error rate is greater than the threshold for the error rate, then the transmission quality of wireless communication from the further luminaire to the module may not be sufficient to ensure that every data packet transmitted from the further luminaire is receivable by the receiver of the module.

The processing unit may be configured to continuously store the packet number of received data packets in association with the address of the respective data packet chronologically in the data storage. The processing unit may be configured to continuously compute for the address of the further luminaire, based on the packet numbers of the received data packets (stored in the data storage in association with the address of the further luminaire), the error rate with regard to receiving the data packets from the further luminaire.

According to a second aspect of the present disclosure, a module for a luminaire is provided. The module comprises a processing unit, a receiver for wireless communication and a data storage. The receiver is configured to receive data packets, each comprising information on an event and/or a command in association with the address of a further luminaire, which transmitted the received data packets, and a packet number. The later a respective received data packet of the received data packets has been transmitted by the further luminaire the greater the packet number of the respective received data packet. The processing unit is configured to chronologically store, in the data storage, the different packet numbers of the received data packets in association with the address of the further luminaire. Further, the processing unit is configured to compute for the address of the further luminaire, based on the different packet numbers of the received data packets, an error rate with regard to receiving the data packets from the further luminaire. Furthermore, the processing unit is configured to perform an action dependent on the information on the event and/or the command of the received data packets, in case the computed error rate is less than or equal to a threshold for the error rate.

The above description with regard to the module of the first aspect is correspondingly valid for the module of the second aspect. Thus, the above description of the processing unit, receiver and data storage of the module according to the first aspect is correspondingly valid for the processing unit, receiver and data storage of the module according to the second aspect. The above description with regard to the data packets receivable by the receiver of the module according to the first aspect is correspondingly valid for the data packets receivable by the receiver of the module according to the second aspect. The above description of the luminaire to which the module according to the first aspect is connectable is correspondingly valid for the luminaire to which the module according to the second aspect is connectable.

The module may be configured to be electrically connected with a bus of the luminaire.

Optionally, the module according to the second aspect comprises a transmitter for wireless communication. The module may be configured to be electrically connected with a bus of the luminaire. In response to an event and/or a command of the luminaire, the processing unit may be configured to control the transmitter to transmit a data packet, when the module is electrically connected with the bus of the luminaire. The data packet comprises information on the event and/or the command of the luminaire in association with an address of the luminaire and a packet number. The packet number is incremented by a number (e.g. by one) each time the processing unit controls the transmitter to transmit the data packet.

The above description with regard to the transmitter of the module according to the first aspect and the data packet transmittable by the transmitter of the module according to the first aspect is correspondingly valid for the optional transmitter of the module according to the second aspect and the data packet transmittable by the optional transmitter of the module according to the second aspect.

Optionally, the bus of the luminaire, to which the module according to the first aspect or the module according to the second module is electrically connectable, is a DALI-2 bus. Thus, the luminaire may be based on the DALI-2 industry standard. In this case, the components of the luminaire, such as the bus, are based on the DALI-2 industry standard respectively are DALI-2 components or DALI-2 compatible components. The bus may be a wired bus.

The term "DALI-2" refers to an industry standard according to "IEC 62386 Edition 2" of the International Electrotechnical Commission, which is the follow-up standard of the industry standard called DALI ("Digital Addressable Lighting Interface") or DALI, Edition 1, wherein DALI and DALI-2 are known industry standards in the technical field of lighting. The term "DALI-2" stands for "Digital Addressable Lighting Interface, Edition 2.

Optionally, the module of the first aspect or the module of the second aspect is configured to be detachably connected to the bus of the luminaire. That is, the module of the first aspect or module of the second aspect may be electrically connected as a separate module to the bus of the luminaire and may also be detached again from the luminaire.

Since the module of the first aspect or the module of the second aspect is configured to be electrically connected, optionally detachably, to the bus of the luminaire, the module of the first aspect or the module of the second aspect may not be a part of a control unit of the luminaire. In case the luminaire is a DALI-2 luminaire or the bus is a DALI-2 bus, the control unit of the luminaire may be a DALI-2 application controller electrically connected to the bus for controlling communication via the bus. The module of the first aspect or the module of the second aspect may be connected besides the control unit and other optional electrical components of the luminaire to the bus of the luminaire.

The module of the first aspect or the module of the second aspect may be configured to be electrically supplied, optionally separately to the control unit, with electrical energy via the bus of the luminaire when the module of the first aspect or the module of the second aspect is connected to the bus. Alternatively or additionally, the module of the first aspect or the module of the second aspect may be configured to be electrically supplied with electrical energy via an own electrical energy source, such as a battery that is optionally rechargeable. Alternatively or additionally, the module of the first aspect or the module of the second aspect may be configured to be electrically supplied with electrical energy via an own power supply terminal, in particular in form of a mains adapter.

The description with regard to the module of the first aspect is correspondingly valid for the module of the second aspect and vice versa. Namely, when the module of the first aspect comprises the transmitter and the optional receiver and the module of the second aspect comprises the receiver and the optional transmitter there may be no difference between these two modules. Thus, the following optional features are correspondingly valid for the module of the first aspect and the module of the second aspect.

Optionally, the transmitter is an infrared transmitter. The transmitter is not limited to an infrared transmitter. Additionally or alternatively, the transmitter may be or may comprise a visible light transmitter, a radio transmitter, an ultrasonic transmitter, an infrasound transmitter and/or any other known transmitter. According to an embodiment, the transmitter may be a short range transmission transmitter, i.e. a transmitter configured to transmit wireless signals in the form of a short range transmission. Examples of a short range transmission (may be referred to as short range communication) comprise infrared transmission, visible light transmission, ultrasound transmission and infrasound transmission. In case the transmitter is a radio transmitter, it may be configured to transmit the wireless signals according to the Bluetooth industry standard, the WLAN industry standard and/or any other known industry standard for radio communication.

In other words, the transmitter may be configured for a visible light communication, infrared communication, ultrasound communication and/or infrasound. The transmitter of the transceiver may be configured to transmit wireless signals in the form of visible light, infrared, ultrasound and/or infrasound. The transmitter may be referred to as wireless transmitter.

Optionally, the receiver is an infrared receiver. The receiver is not limited to an infrared receiver. Additionally or alternatively, the receiver may be or may comprise a visible light receiver, a radio receiver, an ultrasonic receiver, an infrasound receiver and/or any other known receiver. According to an embodiment, the receiver may be a short range transmission receiver, i.e. a receiver configured to receive wireless signals that are transmitted in the form of a short range transmission. In case the receiver is a radio receiver, it may be configured to receive wireless signals according to the Bluetooth industry standard, the WLAN industry standard and/or any other known industry standard for radio communication.

In other words, the receiver may be configured for a visible light communication, infrared communication, ultrasound communication and/or infrasound. The receiver of the transceiver may be configured to receive wireless signals in the form of visible light, infrared, ultrasound and/or infrasound. The receiver may be referred to as wireless receiver.

The processing unit may be or may comprise a processor, microprocessor, controller, microcontroller, application-specific integrated circuit (ASIC), field-programmable gate array (FPGA) or any combination of these elements.

The processing unit may be configured to perform the action dependent on the event and/or the command of the received data packets, and stop performing the action, in case the computed error rate is greater than the threshold for the error rate.

That is, according to one optional alternative, the processing unit may be configured to perform the action dependent on the event and/or the command of the received data packets already before the error rate (with regard to receiving the data packets from the further luminaire) is computed or before a computation of the error rate is finished. According to this optional alternative, when the computed error rate is greater than the threshold for the error rate, the processing unit stops performing the action.

According to another optional alternative, the processing unit may be configured to wait performing the action dependent on the event and/or the command of the received data packets until the error rate (with regard to receiving the data packets from the further luminaire) is computed. In other words, the processing unit may be configured to not perform the action dependent on the event and/or the command of the received data packets until the error rate (with regard to receiving the data packets from the further luminaire) is computed. According to this other optional alternative, when the computed error is less than or equal to the threshold for the error rate, the processing unit is configured to perform or start performing the action.

The processing unit may be configured to monitor the bus of the luminaire when the module is electrically connected with the bus. Further, the processing unit may be configured to generate, based on a bus signal transmitted via the bus, the data packet to be transmitted by the transmitter, wherein the bus signal is indicative of the event and/or the command of the luminaire.

In response to the event and/or the command of the luminaire, the processing unit may be configured to control the transmitter to repeatedly transmit the data packet. Optionally, in response to the event and/or the command of the luminaire, the processing unit is configured to control the transmitter to periodically transmit the data packet.

Optionally, the action comprises converting the information on the event and/or the command of the received data packets into bus signals (optionally DALI-2 signals) and inputting the bus signals to the bus, when the module is electrically connected with the bus.

In other words, in case the computed error rate is less than or equal to the threshold for the error rate, the processing unit may be configured to convert the information on the event and/or the command of the received data packets into bus signals and inputting the bus signals to the bus, when the module is electrically connected with the bus.

This allows controlling light emission of the luminaire based on the bus signals that are indicative of the information on the event and/or the command comprised by the receive data signals.

The bus signal may be indicative of the information of a received data packet as if this information has been locally obtained at the luminaire to which the module is connectable. For example, in case a received data packet of the received data packets comprises information on an event indicating that at the further luminaire presence and/or movement of a person is detected, then the processing unit may be configured to convert this information into a bus signal such that the bus signal indicates that presence and/or movement of a person is detected. For other electrical components of the luminaire that may be connected to the bus there may be no difference between the aforementioned bus signal and a bus signal indicating that presence and/or movement of a person is detected in vicinity of the luminaire to which the module is connectable.

For example, in case a received data packet of the receive data packets comprises information on a command instructing to start light emission, then the processing unit may be configured to convert this information into a bus signal instructing to start light emission. For other electrical components of the luminaire that may be connected to the bus there may be no difference between the aforementioned bus signal and a bus signal instructing to start light emission that has been generated by one of the other electrical components of the luminaire.

The action may comprise generating, based on each received data packet of the received data packets, a further data packet comprising the information on the event and/or the command of the respective received data packet in association with an address of the luminaire and a further packet number. The further packet number is incremented by a number (e.g. by one) each time the processing unit controls the transmitter to transmit the further data packet. The action may further comprise controlling the transmitter to transmit the further data packet.

In other words, when the computed error rate is less than or equal to the threshold for the error rate, the module may be configured to retransmit the information on the event and/or the command of a received data packet of the received data packets together with the address of the luminaire and a further packet number (when the module is associated with the luminaire or connected to the bus of the luminaire). For this, the processing unit may be configured to generate a further data packet comprising the information on the event and/or the command of the received data packet of the received data packets in association with the address of the luminaire and the further packet number. Further, the processing unit may be configured to control the transmitter to transmit the further data packet.

Optionally, the received data packets each comprise a count; and when the count of the received data packets is greater than zero, the action comprises decrementing the count of each received data packet of the received data packets by one. Further, the action may comprise generating, based on each received data packet of the received data packets, a further data packet comprising the decremented count and the information on the event and/or the command of the respective received data packet in association with an address of the luminaire and a further packet number. The further packet number is incremented by a number (e.g. by one) each time the processing unit controls the transmitter to transmit the further data packet. Furthermore, the action may comprise controlling the transmitter to transmit the further data packet.

In other words, when the computed error rate is less than or equal to the threshold for the error rate and the count of a received data packet of the received data packets is greater than zero, the module may be configured to retransmit the information on the event and/or the command of the received data packet together with the address of the luminaire and a further packet number (when the module is associated with the luminaire or connected to the bus of the luminaire). For this, the processing unit may be configured to generate a further data packet comprising the count decremented by one and the information on the event and/or the command of the received data packet of the received data packets in association with the address of the luminaire and the further packet number. Further, the processing unit may be configured to control the transmitter to transmit the further data packet.

The count of a received data packet indicates the number of luminaires via which the information of the received data packet is to be transmitted from an initial luminaire that initially transmitted the information of the received data packet.

Alternatively, the received data packets each may comprise a count and when the count of the received data packets is less than a threshold for the count, the action may comprise incrementing the count of each receive data packet of the received data packets by one. Further, the action may comprise generating, based on each received data packet of the received data packets, a further data packet comprising the incremented count and the lighting information of the respective received data packet in association with an address of the luminaire and a further packet number. The further packet number is incremented by a number (e.g. by one) each time the processing unit controls the transmitter to transmit the further data packet. Furthermore, the method may comprise controlling the transmitter to transmit the further data packet.

According to the aforementioned alternative, the count of a received data packet indicates the number of luminaires via which the information of the received data packet has been transmitted from an initial luminaire that initially transmitted the information of the received data packet. The processing unit may be configured to compute or determine based on the count a distance to the initial luminaire.

The processing unit may be configured to compute for the address of the further luminaire the error rate when the number of received data packets each comprising the address of the further luminaire is greater than or equal to a threshold for the number of received packets.

In other words, the processing unit may be configured to start computing for the address of the further luminaire (that is with regard to the wireless communication from the further luminaire) the error rate as soon as the number of received data packets from the further luminaire is greater than or equal to a threshold for the number of received packets.

Optionally, the processing unit is configured to compute for the address of the further luminaire the error rate based on a currently received data packet comprising the address of the further luminaire by

- determining, based on data stored in the data storage, the packet number of a previously received data packet comprising the address of the further luminaire, wherein the amount of data packets received between the previously received data packet and the currently received data packet is one less than the threshold for the number of received data packets,
- computing a difference between the packet number of the currently received data packet and the determined packet number, and
- dividing the computed difference by the threshold for the number of received packets.

For the computation of the error rate, older packet numbers (i.e. packet number stored for a longer time in the data storage) may be used with a lower priority compared to newer packets number (i.e. packet numbers stored for a shorter time in the data storage).

When the data storage is full, the processing unit may be configured to overwrite the packet number stored for the longest time in the data storage with the packet number of a currently received data packet.

Optionally, the threshold for the number of received packets is at least one less than the number of packet numbers that may be stored in the data storage.

When the data storage is full, the processing unit may be configured to overwrite the packet number stored for the longest time in the data storage with the packet number of a currently received data packet, wherein the packet number stored for the longest time is associated with the same address as the address comprised by the currently received data packet.

Optionally, the data packet to be transmitted by the transmitter comprises: information on whether the information on the event and/or the command of the data packet is to be transmitted by a luminaire receiving the data packet; and/or a checksum.

Optionally, each of the received data packets comprises: information on whether the information on the event and/or the command of the data packet is to be transmitted by a luminaire receiving the data packet; and/or a checksum.

The aforementioned information regarding the transmission of information on the event and/or the command may be referred to as time to live information (TTL).

The term "swarm module" may be used for referring to the module of the first aspect or the module of the second aspect.

The data packets transmittable by a module and the data packets receivable by a module may comprise different fields. One field of such a data packet may comprise the information on the event and/or command. This field may be called "event/commando field". A further field may comprise the address of the luminaire from which the data packet is wirelessly transmitted. This field may be called "address field". A further field may comprise the packet number. This field may be called "packet number field".

An optional further field may comprise information on whether the information of the event/command field of the data packet is to be transmitted by a luminaire receiving the data packet. This field may be called "time to lived (TTL) field". Thus, the TTL field may indicate whether the information of the event/command filed of the data packet is to be retransmitted by a luminaire receiving the data packet. Such a retransmitting comprises generating a further data packet comprising the information of the event/command field of the data packet to be retransmitted in association with a further packet number and the address of the luminaire that performs the retransmitting. The further packet number is incremented by a number (e.g. by one) each time the luminaire that performs the retransmitting transmits a data packet.

An optional further field of the data packet may comprise a checksum. This field may be called "checksum field". The optional checksum field allows increasing redundancy e.g. by using a checksum, a cyclic redundancy check (CRC) and/or a negated repetition.

An advantage of the module according to the first aspect and the module of the second aspect is that luminaires comprising such a module may be mobile luminaires. That is, they may be moved within an area without the risk that a reduced transmission quality of data to a luminaire from other luminaires has a negative effect. Namely, due to the computation of the error rate, the respective module performs the action dependent on information on an event and/or a command comprised by a received data packet, when the error rate is less than or equal to the threshold for the error rate.

The processing unit may be configured to determine the error rate with respect to the address of a luminaire. Thus, in case the computed error rate for a first luminaire is greater than the threshold for the error rate, but the computed error rate for a second luminaire is less than or equal to the threshold for the error rate, the processing unit does not perform the action in response to information on an event and/or a command of a data packet received from the first luminaire. The processing unit may perform the action in response to information on an event and/or a command of a data packet received from the second luminaire.

In order to achieve the module according to the first aspect of the present disclosure, some or all of the above described optional features may be combined with each other. In order to achieve the module according to the second aspect of the present disclosure, some or all of the above described optional features may be combined with each other.

According to a third aspect of the present disclosure a luminaire is provided. The luminaire comprises a bus and a control unit electrically connected with the bus. Further, the luminaire comprises a module according to the first aspect or second aspect, as described above, electrically connected with the bus. The control unit is configured to control communication via the bus.

The description of the luminaire to which the module of the first aspect or the module of the second aspect are electrically connectable is correspondingly valid for the luminaire of the third aspect.

The luminaire may be a free-standing luminaire or any other type of luminaire, such as a ceiling lamp, desk-lamp, wall lamp etc. That is, the luminaire may be an indoor luminaire. Alternatively, the luminaire may be an outdoor luminaire (e.g. street luminaire).

Optionally, the bus of the luminaire is a DALI-2 bus. Thus, the luminaire may be based on the DALI-2 industry standard. In this case, the components of the luminaire, such as the bus and the control unit, are based on the DALI-2 industry standard respectively are DALI-2 components or DALI-2 compatible components.

Optionally, the bus is a data bus. The bus may be a wired bus (e.g. bus comprising at least one wired line). The bus may be a data bus that is configured to supply the control unit and/or the module with electrical energy.

In case the luminaire is a DALI-2 luminaire or the bus is a DALI-2 bus, the control unit of the luminaire may be a DALI-2 application controller electrically connected to the bus for controlling communication via the bus. The control unit may be or may comprises a processor, microprocessor, controller, microcontroller, application-specific integrated circuit (ASIC), a field programmable gate array (FPGA) or any combination of these elements. The control unit may represent a central controller of the luminaire for controlling the function of the luminaire. The control unit may be configured to control the light emission of the luminaire. That is, the control unit may be configured to control via the bus the luminaire. The control unit may be a module that is electrically connected to the bus. The control unit may be configured to receive bus signals via the bus from the module of the first aspect or the second aspect.

The luminaire may comprise a presence and/or movement sensor electrically connected with the bus. The presence and/or movement sensor is configured to detect presence and/or movement of a person in a vicinity of the luminaire. Further the presence and/or movement sensor may be configured to transmit, via the bus, bus signals indicating presence and/or movement of a person in the vicinity of the luminaire and/or bus signals indicating no presence and/or no movement of a person in the vicinity of the luminaire.

The luminaire may comprise a light source for light emission of the luminaire. The light source may be or may comprise least one or more light emitting diodes (LEDs), such as organic LEDs, inorganic LEDs etc., which may be electrically connected in parallel and/or in series. The light source is not limited to one or more LEDs, but can alternatively or additionally correspond to other lighting means, such as fluorescence lamps, compact fluorescent lamps etc. The control unit may be configured to control, via the bus, light emission of the light source.

The luminaire may comprise at least one driver (lighting means driver) for driving the light source. The at least one driver is electrically connected with the bus. In case, the light source is or comprises one or more LEDs, the at least one driver may be referred to as LED driver. The control unit may be configured to control, via the bus, the at least one driver in order to control light emission of the light source. The at least one driver is configured to convert an input voltage or input current, supplied from an external energy source, such as mains, into a higher or lower output voltage or output current.

Optionally, the at least one driver comprises at least one actively switched DC-to-DC converter with at least one switch, such as a transistor, and at least one electrical energy storage, such as a choke or an activity, wherein an input voltage or current may be converted into a higher or lower output voltage or current, depending on the type of DC-to-DC converter, by actively switching the at least one switch. Examples of an actively switched DC-to-DC converter are a boost converter, a buck converter, a flyback converter, a resonant converter etc.

In case the at least one driver comprises at least one actively switched DC-to-DC converter, the control unit may be configured to control the switching of the at least one switch of the DC-to-DC converter in order to control the electrical energy directly or indirectly provided to the light source.

The control unit may be configured to control the light emission of the light source by controlling the at least one driver (controlling electrical energy provided by the at least one driver to the light source). The control unit may be configured to control the light emission of the luminaire by transmitting one or more bus signals via the bus.

Luminaires according to the third aspect may wirelessly communicate with each other via the respective module according to the first aspect or second aspect of each luminaire. Thus, the luminaires may wirelessly communicate to each other when one luminaire detects a presence and/or movement of a person in its vicinity. This may be done by wirelessly transmitting one or more data packets as described above. That is, at least one data packet is wirelessly transmitted from the respective module of the luminaire, wherein the data packet comprises information on the event of detecting the presence and/or movement of the person in the luminaire's vicinity in association with the address of the luminaire and a packet number. The packet number is incremented by a number (e.g. by one) each time a data packet is transmitted from the respective module of the luminaire. The module of the luminaire transmitting the data packet is a module according to the first aspect or a module according to the second aspect comprising the optional transmitter. The luminaire may also start light emission in response to the detection of presence and/or movement of the person in its vicinity.

The respective module of neighboring luminaires of the luminaire arranged within the transmission range of the module of the luminaire may receive the data packet wirelessly transmitted from the module of the luminaire. The respective module of the neighboring luminaires is a module according to the second aspect or a module according to the first aspect comprising the optional receiver. In response to the information on the event comprised by the received data packet, the neighboring luminaires may control light emission, e.g. by starting light emission. This is the case, when the error rate with regard to the transmission from the luminaire computed by the respective module of the neighboring luminaire is less than or equal to the threshold for the error rate. In this case, the respective module of a neighboring luminaires may provide, as an action, the neighboring luminaire with the information on the event. This may be done by converting the information on the event into bus signals and inputting the bus signals to the bus of the neighboring luminaire.

Optionally, in case a neighboring luminaire of the neighboring luminaires does not receive the received data packet again after a time period, the neighboring luminaire may stop emitting light after a time out period. By the above procedure, luminaires that are near the luminaire, i.e. within the transmission range of the wireless transmitter of the module of the luminaire, may receive the data packet and, thus, may be controlled in line with the luminaire. For example, they may start light emission in addition to the luminaire starting light emission, in case the luminaire detects presence and/or movement of a person in its vicinity.

The above description with regard to the module according to the first aspect of the present disclosure and the module according to the second aspect of the present disclosure is also valid for the luminaire according to the third aspect of the present disclosure. The description of the luminaire of the third aspect is correspondingly valid for the luminaire, to which the module of the first aspect or the module of the second aspect are electrically connectable.

The luminaire according to the third aspect of the present disclosure achieves the same advantages as the module according to the first aspect of the disclosure and the module according to the second aspect of the disclosure.

In order to achieve the luminaire according to the third aspect of the invention, some or all of the above described optional features may be combined with each other.

According to a fourth aspect of the present disclosure a system is provided. The system comprises a first module according to the first aspect, as described above, and a second module according to the second aspect, as described above.

The above description with regard to the module according to the first aspect of the present disclosure and the module according to the second aspect of the present disclosure is also valid for the system according to the fourth aspect of the invention.

The system according to the fourth aspect of the present disclosure achieves the same advantages as the module according to the first aspect of the disclosure and the module according to the second aspect of the disclosure.

In order to achieve the system according to the fourth aspect of the invention, some or all of the above described optional features may be combined with each other.

According to a fifth aspect of the present disclosure a lighting system is provided. The lighting system comprises a first luminaire according to the third aspect, as described above, and a second luminaire according to the third aspect, as described above. The first luminaire comprises a module according to the first aspect, as described above, and the second luminaire comprises a module according to the second aspect, as described above.

The lighting system according to the fifth aspect of the present disclosure achieves the same advantages as the module according to the first aspect of the disclosure and the module according to the second aspect of the disclosure.

BRIEF DESCRIPTION OF THE DRAWINGS

In the following, the invention is described exemplarily with reference to the enclosed figures, in which.

DETAILED DESCRIPTION OF THE EMBODIMENT

In the Figures, corresponding elements have the same reference signs.

Figure 1:
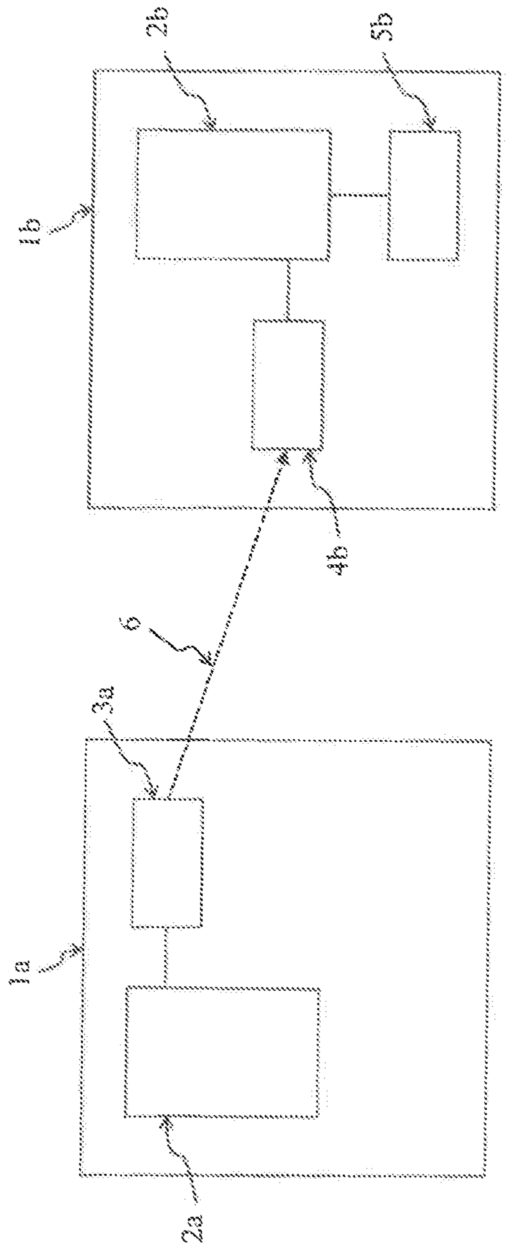
FIG. 1 is a schematic block diagram of a first module for a luminaire and a second module for a luminaire according to an embodiment of the invention.

FIG. 1 is a schematic block diagram of a first module for a luminaire and a second module for a luminaire according to an embodiment of the invention. In particular, the first module of FIG. 1 is an example of the module according to the first aspect, as described above, and the second module is an example of the module according to the second aspect, as described above.

As shown on the left side of FIG. 1, a first module 1*a* comprises a processing unit 2*a* and a transmitter 3*a* for wireless communication. The first module 1*a* is configured to be electrically connected with a bus of a luminaire (not shown in FIG. 1). In response to an event and/or a command of the luminaire, the processing unit 2*a* is configured to control the transmitter 3*a* to transmit a data packet 6 when the module 1*a* is electrically connected with the bus of the luminaire. The data packet comprises information on the event and/or the command of the luminaire in association with an address of the luminaire and a packet number. The packet number is incremented by a number (e.g. by one) each time the processing unit 2*a* controls the transmitter to transmit the data packet.

As shown on the right side of FIG. 1, a second module 1*b* comprises a processing unit 2*b*, a receiver 4*b* for wireless communication and a data storage 5*b*. The receiver 4*b* is configured to receive data packets 6, each comprising information on an event and/or a command in association with the address of a further luminaire (not shown in FIG. 1), which transmitted the received data packets 6, and a packet number. The later a respective received data packet 6 of the received data packets 6 has been transmitted by the further luminaire the greater the packet number of the respective received data packet 6. The processing unit 2*b* is configured to chronologically store, in the data storage 5*b*, the different packet numbers of the received data packets 6 in association with the address of the further luminaire. Further, the processing unit 2*b* is configured to compute for the address of the further luminaire, based on the different packet numbers of the received data packets 6, an error rate with regard to receiving the data packets 6 from the further luminaire. Furthermore, the processing unit is configured to perform an action dependent on the information on the event and/or the command of the received data packets 6, in case the computed error rate is less than or equal to a threshold for the error rate.

The second module 1*b* may be configured to be electrically connected with a bus of a luminaire (not shown in Figure). This luminaire may be referred to as second luminaire in order to distinguish it from the luminaire, to which the first module 1*a* may be electrically connected.

In the example shown in FIG. 1, the luminaire, to which the first module 1*a* may be electrically connected to, may correspond to the further luminaire from which the receiver 4*b* of the second module 1*b* wirelessly receives data packets 6. Thus, when the transmitter 3*a* of the first module 1*a* wirelessly transmits a data packet 6, the receiver 4*b* of the second module 1*b* may receive that data packet 6.

Figure 3:
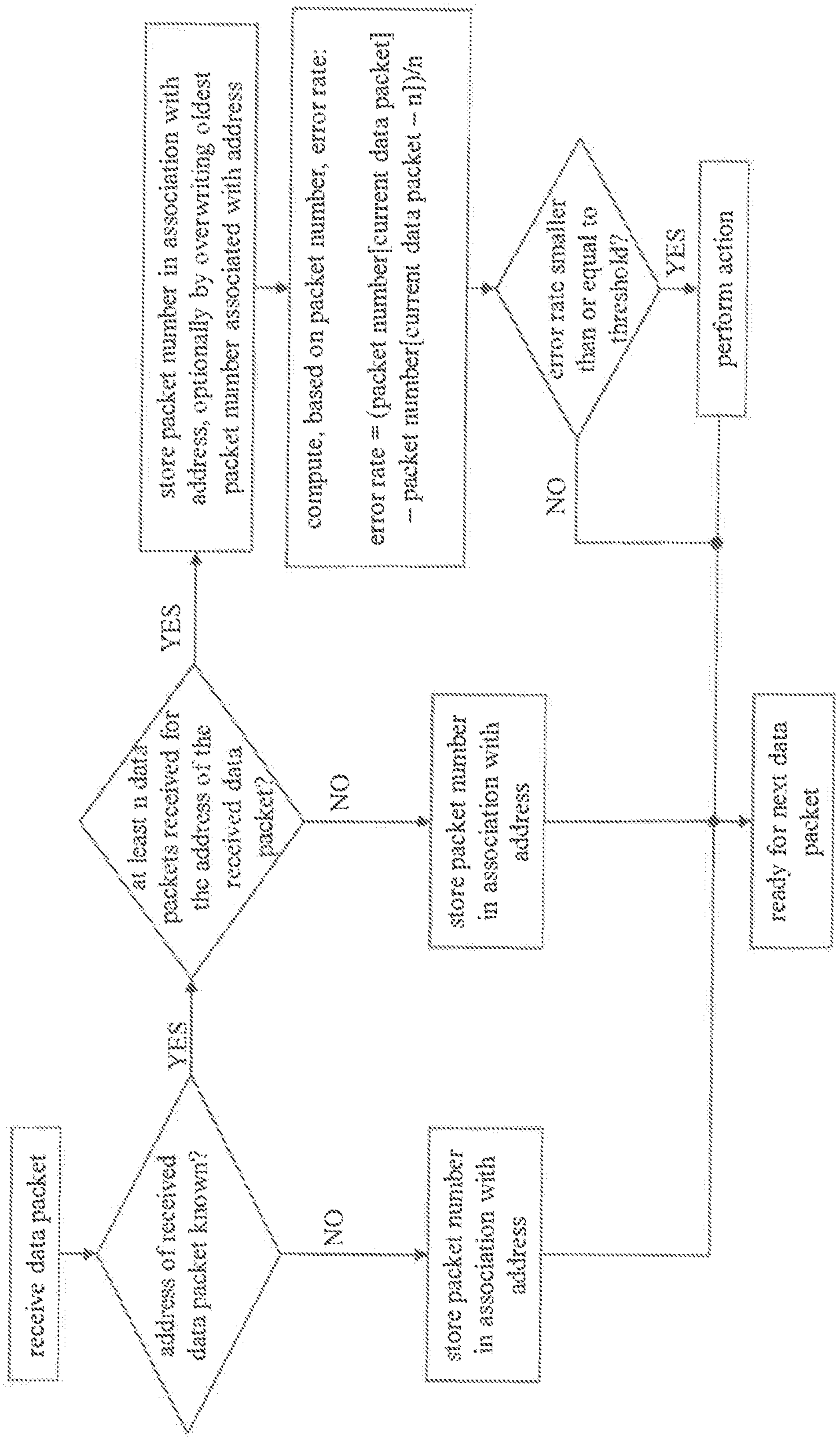
FIG. 3 is a schematic flow diagram for computing an error rate with regard to receiving data packets from a further luminaire according to an embodiment of the invention.

An example of how the processing unit 4*b* of the second module 1*b* may be configured to compute, with regard to a wireless communication from the further luminaire, the error rate with regard to receiving data packets from the further luminaire is shown in FIG. 3.

The first module 1*a* and the second module 1*b* may form a system or may be part of a system. Such a system is an example of the system according to the fourth aspect of the disclosure.

For further details on the first module 1*a* and the second module 1*b* of FIG. 1 reference is made to the above description of the module according to the first aspect of the disclosure and the module according to the second aspect of the disclosure. For further details on the luminaire, to which the first module 1*a* is electrically connectable, and the second luminaire, to which the second module 1*b* is optionally connectable, reference is made to the above description of the luminaire according to the third aspect of the disclosure.

Figure 2:
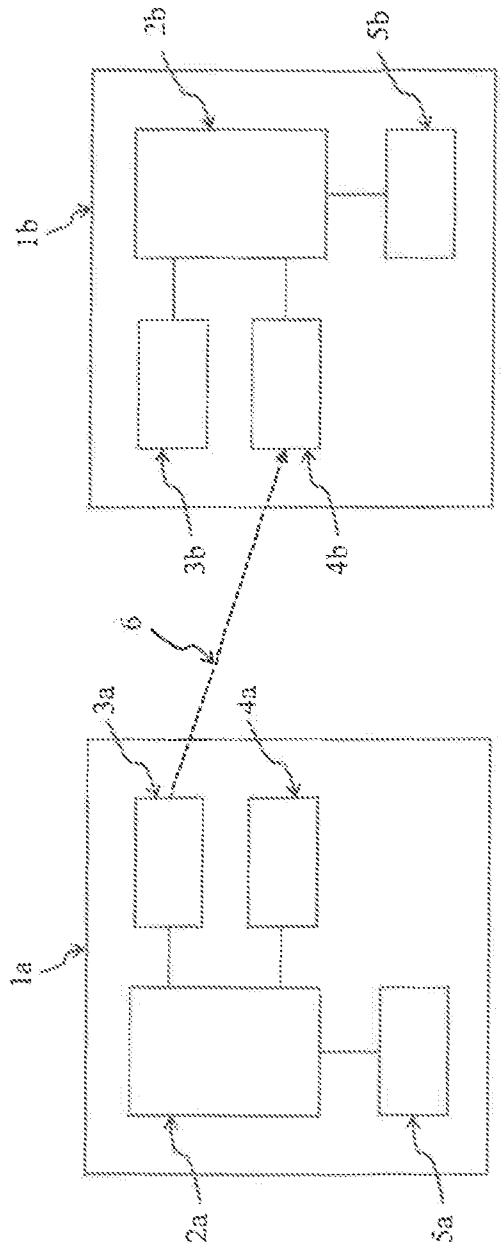
FIG. 2 is a schematic block diagram of a first module for a luminaire and a second module for a luminaire according to an embodiment of the invention.

FIG. 2 is a schematic block diagram of a first module for a luminaire and a second module for a luminaire according to an embodiment of the invention. The first module and second module of FIG. 2 are an implementation form of the first module and second module of FIG. 1, respectively.

Therefore, the above description of FIG. 1 is correspondingly valid for the first module and second module of FIG. 2 and in the following mainly additional optional features of the first module and second module of FIG. 2 are described.

As shown on the right side of FIG. 2, the second module 1*b* may comprise an optional transmitter 3*b* for wireless communication (in addition to the processing unit 2*b*, the receiver 4*b* and the data storage 5*b*). The second module 1*b* may be configured to be electrically connected with a bus of a luminaire (not shown in FIG. 2). In the following, this luminaire is referred to as second luminaire in order to distinguish it from the luminaire to which the first module 1*a* may be electrically connected to. In response to an event and/or a command of the second luminaire, the processing unit 2*b* may be configured to control the transmitter 3*b* to transmit a data packet, when the module 1*b* is electrically connected with the bus of the second luminaire. The data packet comprises information on the event and/or the command of the second luminaire in association with an address of the second luminaire and a packet number. The packet number is incremented by a number (e.g. by one) each time the processing unit 2*b* controls the transmitter 3*b* to transmit the data packet.

As shown on the left side of FIG. 2, the first module 1*a* may comprise, in addition to the processing unit 2*a* and the transmitter 3*a*, an optional receiver 4*a* for wireless communication and an optional data storage 5*a*. The receiver 4*a* may be configured to receive data packets, each comprising information on an event and/or a command in association with the address of a further luminaire (not shown in FIG. 2), which transmitted the received data packets, and a packet number. The later a respective received data packet of the received data packets has been transmitted by the further luminaire the greater the packet number of the respective received data packet. The processing unit 2*a* may be configured to chronologically store, in the data storage 5*a*, the different packet numbers of the received data packets in association with the address of the further luminaire. Further, the processing unit 2*a* may be configured to compute for the address of the further luminaire, based on the different packet numbers of the received data packets, an error rate with regard to receiving the data packets from the further luminaire. Furthermore, the processing unit 2*a* may be configured to perform an action dependent on the information on the event and/or the command of the received data packets, in case the computed error rate is less than or equal to a threshold for the error rate.

In the example shown in FIG. 2, the second luminaire, to which the second module 1*b* may be electrically connected to, may correspond to the further luminaire from which the receiver 4*a* of the first module 1*a* wirelessly receives data packets. Thus, when the transmitter 3*b* of the second module 1*b* wirelessly transmits a data packet, the receiver 4*a* of the first module 1*a* may receive that data packet.

For further details on the first module 1*a* and the second module 1*b* of FIG. 2 reference is made to the above description of the module according to the first aspect of the disclosure and the module according to the second aspect of the disclosure as well as to the above description of the first module and second module of FIG. 1. For further details on the second luminaire, to which the second module 1*b* is electrically connectable, reference is made to the above description of the luminaire according to the third aspect of the disclosure.

FIG. 3 is a schematic flow diagram for computing an error rate with regard to receiving data packets from a further luminaire according to an embodiment of the invention. In the following description, reference is made to the second module of FIGS. 1 and 2. Therefore, the reference signs of FIGS. 1 and 2 of the second module and its components are used in the following description. This description is also valid for the first module of FIG. 2 comprising the optional receiver and optional data storage.

As shown in FIG. 3, when the receiver 4*b* of the second module 2*b* receives a data packet 6, the processing unit 2*b* of the second module determines whether the address of a further luminaire comprised by the received data packet 6 is already known or not. In case, it is not known ("NO" at "address of received data packet known?"), the processing unit 2*b* stores, in the data storage 5*b*, the packet number of the received data packet 6 in association with the address of the further luminaire. The storing is performed chronologically. That is, for the address of the further luminaire, packet numbers comprised by data packets received from the further luminaire are stored in association with the address of the further luminaire in the order they are received by the receiver 4*b*. Next, the second module 1*b* is ready for receiving a next data packet.

In case, the address of the further luminaire comprised by the received data packet 6 is already known ("YES" at "address of received data packet known?"), the processing unit 2*b* determines, based on data of the data storage 5*b*, whether for the address of the further luminaire at least n data packets have already been received. That is, the processing unit determines whether already n data packets have been received from the further luminaire. The symbol "n" is a positive integer. It denotes or represent a threshold value for the number of data packets that need to be received from the further luminaire, before the processing unit starts for the wireless communication from the further luminaire to compute or determine an error rate with regard to receiving data packets from the further luminaire. If this is not the case ("NO" at "at least n data packets received for the address of the received data packet?"), the processing unit 2*b* stores, in the data storage 5*b*, the packet number of the received data packet in association with the address of the further luminaire. Next, the second module 1*b*, is ready for receiving a next data packet.

In case for the address of the further luminaire at least n data packets have already been received ("YES" at "at least n data packets received for the address of the received data packet?"), the processing unit 2*b* stores, in the data storage 5*b*, the packet number of the received packet in association with the address of the further luminaire. Optionally, the processing unit 2*b* stores, in the data storage 5*b*, the packet number of the received packet in association with the address of the further luminaire by overwriting the packet number associated with the address of the further luminaire that has been stored for the longest time in the data storage 5*b*. In other words, the processing unit optionally overwrites the oldest packet number associated with the address of the further luminaire with the packet number of the received data packet.

Next the processing unit 2*b* computes the error rate with regard to receiving data packets from the further luminaire by performing the following steps: Determining, based on the data stored in the data storage 5*b*, the packet number of a previously received data packet comprising the address of the further luminaire ("packet number [current data packet-n]"). The amount of data packets received between the previously received data packet and the received data packet is one less than the threshold for the number of received data packets. That is, the amount of data packets received between the previously received data packet and the received data packet is one less than the positive integer n (i.e. n−1). Computing a difference between the packet number of the received data packet and the determined packet number. That is, subtracting the determined packet number from the packet number of the received data packet ("packet number [current data packet]−packet number[current data packet-n]"). Dividing the computed difference by the threshold for the number of received packets. That is, dividing the computed difference by the positive integer n ("(packet number[current data packet]−packet number [current data packet-n])/n").

Next, the processing unit 2*b* determines whether the computed error rate is smaller than or equal to a threshold for the error rate. In case the computed error rate is smaller than or equal to the threshold for the error rate ("YES" at "error rate smaller than or equal to threshold?"), the processing unit performs an action dependent on the information on an event and/or a command of the received data packet 6. Otherwise, ("NO" at "error rate smaller than or equal to threshold?") the processing unit does not perform the action. Next, the second module 1*b* is ready for receiving a next data packet.

The process for determining or computing the error rate may correspond to a state machine. The present disclosure is not limited to the process of FIG. 3 for computing the error rate and, thus, other methods may be used for computing the error rate for an address of a luminaire based on packet numbers associated to the address of the luminaire.

Figure 4:
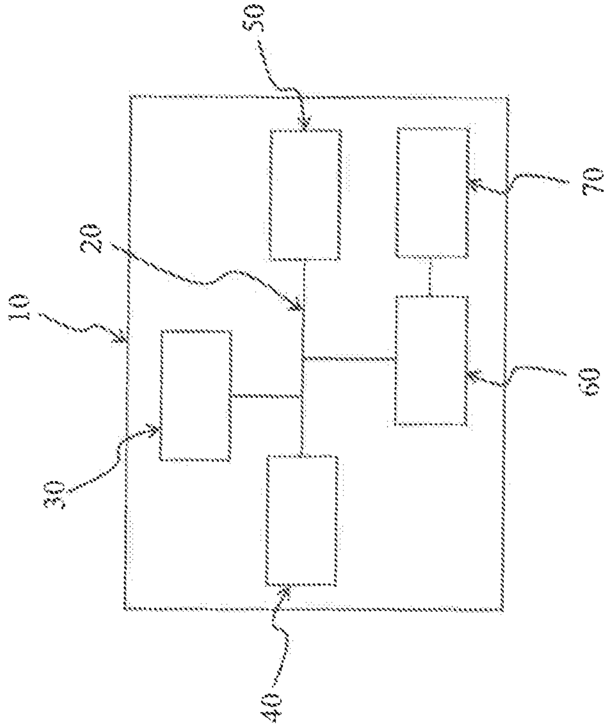
FIG. 4 is a schematic block diagram of a luminaire according to an embodiment of the invention.

FIG. 4 is a schematic block diagram of a luminaire according to an embodiment of the invention. In particular, FIG. 4 shows an example of the luminaire according to the third aspect, as described above.

The luminaire 10 of Figure comprises a bus 20 and a control unit 30, wherein the control unit 30 is electrically connected with the bus 20. Further, the luminaire 10 comprises a module 40 electrically connected with the bus. The module 40 may be the first module 1*a* or the second module 1*b* of FIGS. 1 and 2. The control unit 30 is configured to control communication via the bus 20.

Optionally, the luminaire comprises a presence and/or movement sensor 50 electrically connected with the bus 20. The presence and/or movement sensor 50 is configured to detect presence and/or movement of a person in a vicinity of the luminaire 10. Further, the presence and/or movement sensor 50 may be configured to transmit, via the bus 20, bus signals indicating presence and/or movement of a person in the vicinity of the luminaire 10 and/or bus signals indicating no presence and/or no movement of a person in the vicinity of the luminaire 10. The luminaire 10 may comprise a light source 70 for light emission of the luminaire 10. The luminaire 10 may comprise at least one driver 60 (lighting means driver) for driving the light source 70. The at least one driver 60 is electrically connected with the bus 20.

For further details on the luminaire 10 of FIG. 4 reference is made to the above description of the luminaire according to the third aspect of the disclosure. For further details on the module 40 of the luminaire 10, which may be the first module 1*a* or the second module 1*b* of FIGS. 1 and 2, reference is made to the above description of FIGS. 1 to 3, the description of the module according to the first aspect of the disclosure and the description of the module according to the second aspect of the disclosure.

All steps which are performed by the various entities described in the present disclosure as well as the functionalities described to be performed by the various entities are intended to mean that the respective entity is adapted to or configured to perform the respective steps and functionalities. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A module (1*a*) for a luminaire, wherein the module (1*a*) comprises a processing unit (2*a*) and a transmitter (3*a*) for wireless communication;

the module (1*a*) is configured to be electrically connected with a bus of the luminaire, in response to an event and/or a command of the luminaire, the processing unit (2*a*) is configured to control the transmitter (3*a*) to transmit a data packet (6), when the module (1*a*) is electrically connected with the bus of the luminaire; and the data packet (6) comprises information on the event and/or the command of the luminaire in association with an address of the luminaire and a packet number; wherein the packet number is incremented by a number, optionally incremented by one, each time the processing unit (2*a*) controls the transmitter (3*a*) to transmit the data packet (6); and wherein the module (1*a*) comprises a receiver (4*a*) for wireless communication and a data storage (5*a*);

the receiver (4*a*) is configured to receive data packets, each comprising information on an event and/or a command in association with the address of a further luminaire, which transmitted the received data packets, and a packet number;

wherein the later a respective received data packet of the received data packets has been transmitted by the further luminaire the greater the packet number of the respective received data packet; and wherein the processing unit (2*a*) is configured to chronologically store, in the data storage (5*a*), the different packet numbers of the received data packets in association with the address of the further luminaire, compute for the address of the further luminaire, based on the different packet numbers of the received data packets, an error rate with regard to receiving the data packets from the further luminaire, and perform an action dependent on the information on the event and/or the command of the received data packets, in case the computed error rate is less than or equal to a threshold for the error rate; and further wherein the processing unit (2*a*, 2*b*) is configured to perform the action dependent on the event and/or the command of the received data packets, and stop performing the action, in case the computed error rate is greater than the threshold for the error rate.

2. The module (1*b*) according to claim 1, wherein wherein the packet number is incremented by a number, each time the processing unit (2*b*) controls the transmitter (3*b*) to transmit the data packet (6).

3. The module (1*a*, 1*b*) according to claim 1, wherein in response to the event and/or the command of the luminaire, the processing unit (2*a*, 2*b*) is configured to control the transmitter (3*a*, 3*b*) to repeatedly and periodically transmit the data packet.

4. The module (1*a*, 1*b*) according to claim 1, wherein the action comprises converting the information on the event and/or the command of the received data packets into DALI-2 bus signals, and inputting the DALI-2 bus signals to the bus, when the module (1*a*, 1*b*) is electrically connected with the bus.

5. The module (1*a*, 1*b*) according to claim 1, wherein the received data packets each comprise a count; and when the count of the received data packets is greater than zero, the action comprises:

decrementing the count of each received data packet of the received data packets by one;

generating, based on each received data packet of the received data packets, a further data packet comprising the decremented count and the information on the event and/or the command of the respective received data packet in association with an address of the luminaire and a further packet number, wherein the further packet number is incremented by a number, each time the processing unit (2*a*) controls the transmitter (3*a*) to transmit the further data packet (6); and controlling the transmitter (3*a*, 3*b*) to transmit the further data packet.

6. The module (1*a*, 1*b*) according to claim 1, wherein the processing unit (2*a*, 2*b*) is configured to compute for the address of the further luminaire the error rate when the number of received packets each comprising the address of the further luminaire is greater than or equal to a threshold for the number of received packets.

7. The module (1*a*, 1*b*) according to claim 6, wherein the processing unit (2*a*, 2*b*) is configured to compute for the address of the further luminaire the error rate based on a currently received data packet comprising the address of the further luminaire by determining, based on data stored in the data storage (5*a*, 5*b*), the packet number of a previously received data packet comprising the address of the further luminaire, wherein the amount of data packets received between the previously received data packet and the currently received data packet is one less than the threshold for the number of received data packets, computing a difference between the packet number of the currently received data packet and the determined packet number, dividing the computed difference by the threshold for the number of received packets.

8. The module (1*a*, 1*b*) according to claim 1, wherein when the data storage (5*a*, 5*b*) is full, the processing unit (2*a*, 2*b*) is configured to overwrite the packet number stored for the longest time in the data storage with the packet number of a currently received data packet.

9. The module (1*a*, 1*b*) according to claim 1, wherein the data packet to be transmitted by the transmitter (3*a*, 3*b*) or each of the received data packets comprises:

information on whether the information on the event and/or the command of the data packet is to be transmitted by a luminaire receiving the data packet; and/or a checksum.

10. The module (1*a*, 1*b*) according to claim 1 wherein said transmitter is an infrared transmitter and said receiver is an infrared receiver.

11. The module (1*a*, 1*b*) according to claim 1 wherein the bus is a DALI-2 bus.

* * * * *